(12) United States Patent  (10) Patent No.: US 7,523,521 B2
Lee  (45) Date of Patent: Apr. 28, 2009

(54) WIPER ASSEMBLY FOR A VEHICLE

(75) Inventor: Jae Hyun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 783 days.

(21) Appl. No.: 11/176,627

(22) Filed: Jul. 6, 2005

(65) Prior Publication Data

US 2006/0005341 A1    Jan. 12, 2006

(30) Foreign Application Priority Data

Jul. 9, 2004    (KR) ................ 10-2004-0053349

(51) Int. Cl.
*B60S 1/06* (2006.01)
(52) U.S. Cl. .......... 15/250.31; 15/250.3; 277/634; 277/637; 277/641
(58) Field of Classification Search ........... 15/250.31, 15/250.3, 250.27, 250.34; 296/96.15, 192; 277/630, 634, 637, 641, 644, 650
See application file for complete search history.

(56) References Cited

U.S. PATENT DOCUMENTS

| | | | | |
|---|---|---|---|---|
| 5,755,005 A | * | 5/1998 | Turbessi et al. | .......... 15/250.34 |
| 5,774,928 A | * | 7/1998 | Schitter et al. | ........... 15/250.34 |
| 6,059,294 A | * | 5/2000 | Gorce | ................. 277/630 |
| 6,611,987 B1 | * | 9/2003 | Nakazato et al. | ......... 15/250.31 |
| 6,742,827 B1 | * | 6/2004 | Buchanan, Jr. | ........... 296/96.15 |
| 2004/0010879 A1 | * | 1/2004 | Zimmer | .................. 15/250.3 |

FOREIGN PATENT DOCUMENTS

| | | | |
|---|---|---|---|
| EP | 0955220 | * | 11/1999 |
| FR | 2774340 | * | 8/1999 |
| GB | 2213709 | * | 8/1989 |
| JP | 2001-110166 | | 10/2002 |
| JP | 2001-207590 | | 1/2003 |

OTHER PUBLICATIONS

Abstract for EP 0955220 published Nov. 10, 1999.*

* cited by examiner

*Primary Examiner*—Gary K Graham
(74) *Attorney, Agent, or Firm*—Morgan, Lewis & Bockius LLP

(57) ABSTRACT

The present invention provides a wiper assembly capable of minimizing the slant of a connecting rod interposed between wiper driving arms and a motor-driven arm by positioning the wiper driving arm to the substantially same height with the motor-driven arm. Further, the wiper assembly is capable of preventing water or other contaminants from entering a gap between a wiper arm shaft and a wiper driving arm by employing a cap covering the wiper driving arm and the wiper arm shaft, thereby effectively preventing wiper arm assembly malfunction that is caused by the entry of water or contaminants. The cap engages with the wiper arm shaft through a thread formed inside thereof.

4 Claims, 2 Drawing Sheets

WIPER ASSEMBLY FOR A VEHICLE

CROSS REFERENCE TO RELATED APPLICATION

This application claims priority to Korean Patent Application No. 10-2004-0053349, filed on Jul. 9, 2004, the disclosure of which is hereby incorporated by reference in its entirety.

TECHNICAL FIELD OF THE INVENTION

The present invention generally relates to a wiper assembly for a vehicle. More particularly, the present invention sets forth a wiper assembly having an enhanced wiper driving arm so as to reduce vibration and noise during operation, and a cap covering the wiper driving arm to prevent water from entering.

BACKGROUND OF THE INVENTION

A vehicle is commonly provided with a wiper assembly in order to wipe away rain, snow, or dirt accumulated on a windshield glass of the vehicle, thereby ensuring visibility for the driver. The wiper assembly often includes a spraying device that sprays liquid for facilitating the removal of contaminants and lubricating the movement of a wiper blade on the windshield glass.

The wiper assembly often comprises a motor assembly generating driving force with electric input, linkage members for transferring the driving force between each member, and a wiper arm assembly, which actually cleans the windshield while reciprocating on the windshield.

The motor assembly includes a wiper motor and a gear box consisting of a set of gears that changes the motor rotation speed into an appropriate rotational speed. A reciprocating speed of the wiper arm assembly can be adjusted by controlling the current into a serial-wounded field coil and a shunt-wounded field coil of the wiper motor.

The linkage members, which transfer the driving force and interlock a left wiper arm and a right wiper arm, are typically composed of a motor-driven arm installed to a motor shaft, wiper arm shafts, wiper driving arms attached to one end of the wiper arm shafts, and connecting rods to link the motor-driven arms with the wiper driving arms. The wiper arm assembly includes a couple of wiper arms, one end of which is rotatably joined to the wiper arm shaft. Detachably coupled to the other end of the wiper arm is a wiper blade made of rubber material, which is in direct contact with the windshield.

The wiper motor is generally disposed below a hood panel with sufficient void space between the hood panel and the wiper motor in order to ensure pedestrian safety in the event of a collision. As another safety feature, the wiper arm shaft is furnished with a notch that acts as a weak spot to allow the wiper arm shaft to easily break in the event of a collision with a pedestrian, thereby minimizing injury to the pedestrian.

However, the above wiper assembly is disadvantageous in that there is an unpleasant vibration and noise during the operation of the wiper assembly because of the undesirable arrangement of the wiper driving arms and the motor-driven arm. Namely, because the wiper driving arm and the motor-driven arm are not positioned at the same height, a connecting rod interposed between the wiper driving arms and the motor-driven arm is placed at a slant, which generates unpleasant vibration and noise at both joints of the connecting rod.

Moreover, rain or other contaminants enter the gap between the wiper arm shaft and the wiper driving arm, resulting in wiper assembly malfunction.

SUMMARY OF THE INVENTION

The present invention provides a wiper assembly capable of minimizing the slant of a connecting rod interposed between a wiper driving arms and a motor-driven arm by positioning the wiper driving arm to the substantially same height with the motor-driven arm.

Further, the present invention provides a wiper assembly capable of preventing water or other contaminants from entering into a gap between a wiper arm shaft and a wiper driving arm by employing a cap to cover the wiper driving arm and the wiper arm shaft, thereby effectively preventing wiper arm assembly malfunction that is caused by the entry of water or contaminants. The cap engages with the wiper arm shaft through a thread formed inside thereof.

According to one embodiment of the present invention, the wiper assembly comprises an elongated fixing frame having pivoting parts at both ends thereof, a wiper motor attached to the center of the fixing frame, a wiper motor shaft, and a motor-driven arm coupled to the motor shaft. The motor-driven arm is operatively connected to the wiper driving arms via connecting rods while the rotating movement of the motor-driven arm is transforming into a reciprocating motion of the wiper driving arms. The wiper driving arm is integrally jointed to a wiper arm shaft. Formed around the outer circumference of the wiper arm shaft is a thread. In this arrangement, the wiper driving arm is disposed at an upper end of the pivoting part while integrally connecting with the wiper arm shaft, so that the wiper driving arm is positioned at the same height as an upper end of the motor shaft.

Preferably, the connecting rod rotatably coupled to the wiper driving arm is configured to be parallel with the motor-driven arm coupled to the motor shaft.

More preferably, according to an embodiment the present invention, a wiper assembly further comprises a cap covering the wiper driving arm and the wiper arm shaft. The cap comprises a cylindrical hole, inside which a thread is formed so as to engage with the thread of the wiper arm shaft. The cap further includes a channel integrally formed along the contour thereof, which is adapted for discharging water, thereby effectively preventing water from entering into a pivot part. The cap is configured to partially enclose the wiper arm shaft and the wiper driving arm. More preferably, the cap is made of rubber.

BRIEF DESCRIPTION OF THE DRAWINGS

The aforementioned aspects and other features of the present invention will be explained in the following detailed description, taken in conjunction with the accompanying drawings, wherein.

DETAILED DESCRIPTION OF PREFERRED EMBODIMENT

Figure 1:
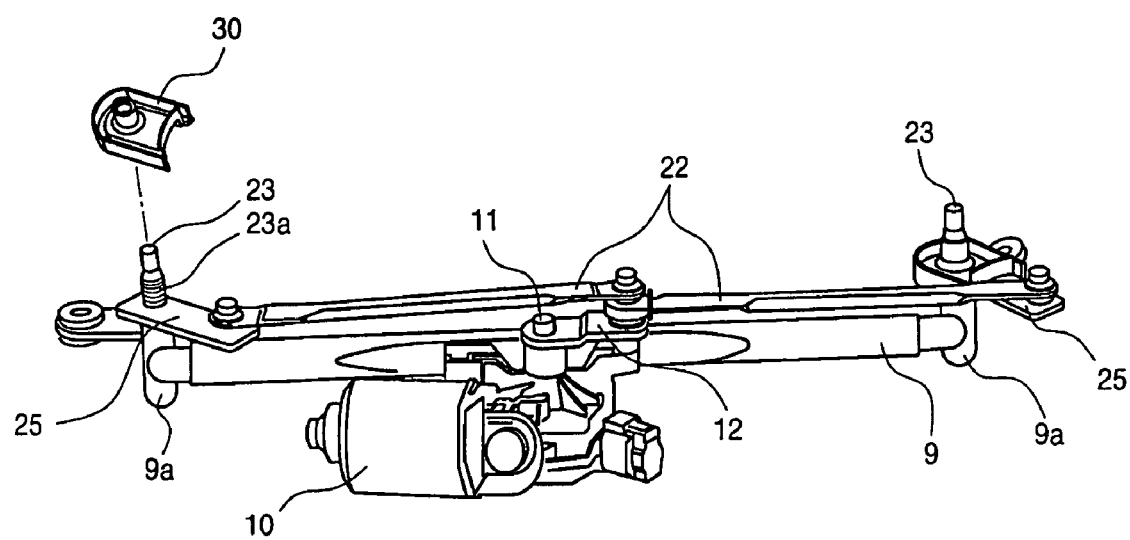
FIG. 1 is a perspective view of a wiper assembly according to an embodiment of the present invention.

As shown in FIG. 1, the wiper assembly includes an elongated fixing frame 9 so as to mount the assembly on a body frame of a vehicle. The elongated fixing frame 9 has pivoting parts 9a at both ends, in which wiper arm shafts 23 are rotatably inserted.

A wiper motor 10 is attached to the approximate center of the fixing frame 9. The rotation of the wiper motor is transferred to a motor-driven arm 12 via a wiper motor shaft 11. The motor-driven arm 12 is operatively connected to wiper driving arms 25 via connecting rods 22 while the rotating movement of the motor-driven arm 12 transforms into a reciprocating motion of the wiper driving arms 25. The wiper driving arm 25 is integrally coupled to a wiper arm shaft 23, which is rotatably inserted in the pivoting part 9a of the fixing frame 9.

The wiper driving arm 25 is disposed at an upper end of the pivoting part 9a, so that the wiper driving arm 25 is positioned at the same height with an upper end of the motor shaft 11. Namely, the connecting rod 22 interconnecting the wiper driving arm 25 and motor driven arm 12 is maintained level with the wiper driving arm 25 and motor driven arm 12. Such an arrangement is advantageous because unpleasant vibration and noise during the operation of the wiper assembly can be minimized by placing the connecting rod 22 level with the wiper driving arm 25 and motor driven arm 12. Moreover, such an arrangement is also preferred because the transferring efficiency of the rotational torque is improved by placing the connecting rod 22 at the upper side of the wiper motor 10.

Figure 2:
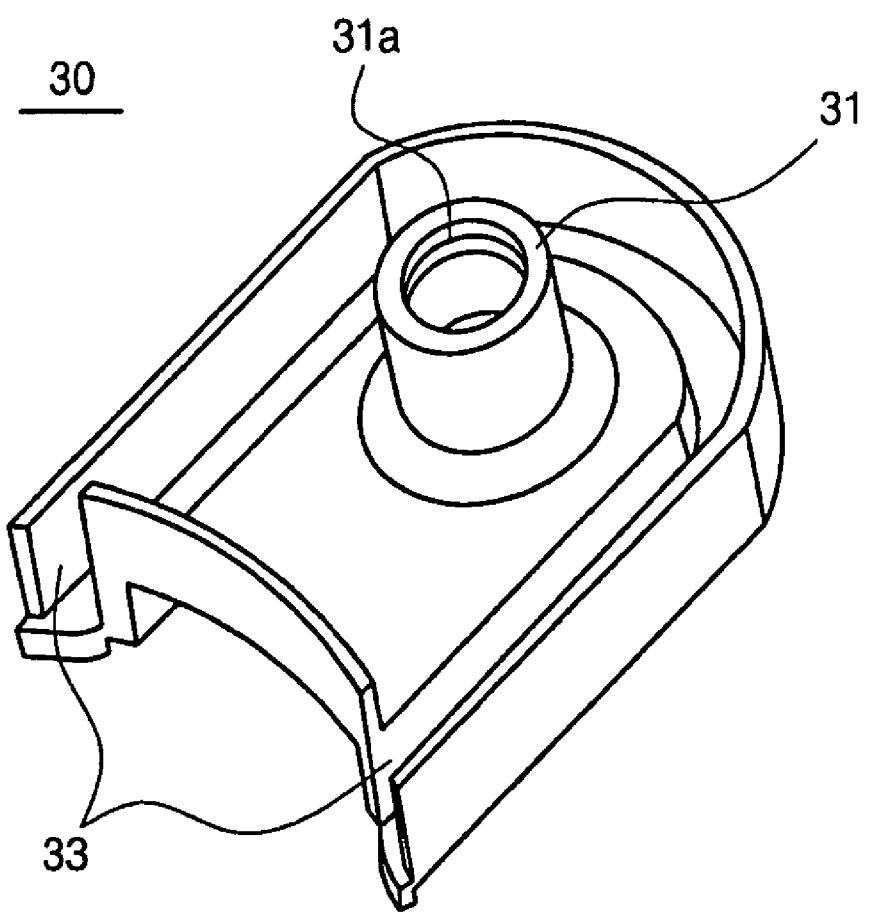
FIG. 2 is a perspective view showing a cap of a wiper assembly according to an embodiment of the present invention.

Formed around the outer circumference of the wiper arm shaft 23 is a thread 23a. Referring to FIGS. 1 and 2, the preferred embodiment of the present invention is further provided with a cap 30 covering the wiper driving arm 25 and the wiper arm shaft 23 in order to prevent water or other contaminants from entering a gap formed between. The cap 30 is made of rubber. The cap 30 is provided with a cylindrical hole 31 at the approximate center thereof, inside which a thread 31a is formed so as to engage with the thread 23a of the wiper arm shaft 23. The cap 30 further includes a channel 33 integrally formed along the contour thereof, which is adapted for discharging water, thereby effectively preventing water from entering into a pivot part 9a. The cap is configured to partially enclose the wiper arm shaft 23 and the wiper driving arm 25.

As described above, the wiper assembly according to the present invention is advantageous because unpleasant vibration and noise during the operation of the wiper assembly can be minimized by placing the connecting rod to be level with the wiper driving arm and motor driven arm. Further, the wiper assembly according to the present invention is advantageous in that a cap having a thread-engagement structure is provided in order to prevent rain or other contaminants from entering into a gap between a wiper arm shaft and a wiper driving arm, thereby effectively preventing wiper assembly malfunction due to such contaminants.

While the foregoing description represent various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. The present disclosed embodiments are, therefore, to be considered in all respects as illustrative and not restrictive, the scope of the invention being indicated by the appended claims and not limited to the foregoing description.

What is claimed is:

1. A wiper assembly, comprising:
   an elongated fixing frame having pivoting parts at both ends thereof;
   a wiper motor attached to an approximate center of the fixing frame;
   a wiper motor shaft;
   a motor-driven arm coupled to the wiper motor shaft;
   a pair of wiper arm shafts rotatably inserted into the pivoting parts, the wiper arm shafts having a thread around the outer circumference thereof;
   a pair of wiper driving arms integrally jointed to the wiper arm shafts; and
   two connecting rods interconnecting the wiper driving arms and the motor-driven arm, wherein the wiper driving arms are disposed at upper ends of the pivoting parts, so that the wiper driving arms are positioned at the same height level with an upper end of the motor shaft; and
   a cap covering the wiper driving arms and the wiper arm shaft, wherein the cap comprises:
   a cylindrical hole, inside which a thread is formed so as to engage with the thread of the wiper arm shafts; and
   a channel integrally formed along the contour thereof, which is adapted for discharging water there through, thereby effectively preventing water from entering into the pivoting parts of the elongated fixing frame.

2. The wiper assembly according to claim 1, wherein the connecting rods rotatably coupled to the wiper driving arms are configured to be level with the motor-driven arm coupled to the wiper motor shaft.

3. The wiper assembly according to claim 1, wherein the cap is made of rubber.

4. The wiper assembly according to claim 1, wherein the cap is configured to partially enclose the wiper arm shafts and the wiper driving arms.

* * * * *